United States Patent
Hama et al.

(10) Patent No.: US 10,936,848 B2
(45) Date of Patent: Mar. 2, 2021

(54) BIOMETRIC IMAGE PROCESSING APPARATUS, BIOMETRIC IMAGE PROCESSING METHOD, AND BIOMETRIC IMAGE PROCESSING PROGRAM

(71) Applicant: FUJITSU LIMITED, Kawasaki (JP)

(72) Inventors: Soichi Hama, Atsugi (JP); Yukihiro Abiko, Kawasaki (JP); Satoshi Maeda, Atsugi (JP); Satoshi Semba, Kawasaki (JP); Hajime Nada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 58 days.

(21) Appl. No.: 16/204,115

(22) Filed: Nov. 29, 2018

(65) Prior Publication Data

US 2019/0171863 A1 Jun. 6, 2019

(30) Foreign Application Priority Data

Dec. 1, 2017 (JP) .............................. JP2017-231976

(51) Int. Cl.
*G06K 9/00* (2006.01)
*H04N 5/232* (2006.01)
(Continued)

(52) U.S. Cl.
CPC ....... *G06K 9/00087* (2013.01); *G06K 9/0004* (2013.01); *G06K 9/00033* (2013.01); *G06K 9/00067* (2013.01); *G06K 9/00885* (2013.01); *G06K 9/00899* (2013.01); *G06K 9/00912* (2013.01); *G06K 9/03* (2013.01); *H04N 5/2171* (2013.01); *H04N 5/23216* (2013.01);
(Continued)

(58) Field of Classification Search
None
See application file for complete search history.

(56) References Cited

U.S. PATENT DOCUMENTS

| 2005/0100200 A1* | 5/2005 | Abiko ................ G06K 9/00026 |
| | | 382/124 |
| 2009/0087022 A1 | 4/2009 | Fukuda et al. |

(Continued)

FOREIGN PATENT DOCUMENTS

| JP | 2006-245976 | 9/2006 |
| JP | 2016-173669 | 9/2016 |

(Continued)

OTHER PUBLICATIONS

EESR—Extended European Search Report dated Apr. 10, 2019 from corresponding European Patent Application No. 18209169.4.

*Primary Examiner* — Suhail Khan
(74) *Attorney, Agent, or Firm* — Fujitsu Patent Center

(57) ABSTRACT

A biometric image processing apparatus includes a touch panel, an biometric sensor configured to capture an image of a living body, and a processor. The processor performs a process including first calculating an amount of movement of the living body that moves on the touch panel while coming into contact with the touch panel, second calculating an amount of movement of each region in images captured by the biometric sensor in a period in which the living body moves on the touch panel while coming into contact with the touch panel, and detecting image noise in the captured images based on the respective amounts of movement calculated by the first calculating and the second calculating.

9 Claims, 10 Drawing Sheets

(51) Int. Cl.
*H04N 5/217* (2011.01)
*G06K 9/03* (2006.01)
*H04N 5/14* (2006.01)
*G06F 3/041* (2006.01)

(52) U.S. Cl.
CPC .... *G06F 3/041* (2013.01); *G06K 2009/00932* (2013.01); *H04N 5/144* (2013.01)

(56) References Cited

U.S. PATENT DOCUMENTS

| | | | |
|---|---|---|---|
| 2015/0371073 A1* | 12/2015 | Cho | G06F 3/04886 382/124 |
| 2016/0092718 A1* | 3/2016 | Jensen | G06K 9/00013 382/124 |
| 2016/0275334 A1 | 9/2016 | Hama et al. | |
| 2016/0328597 A1 | 11/2016 | Abiko et al. | |
| 2017/0083144 A1 | 3/2017 | Nada et al. | |
| 2017/0147863 A1 | 5/2017 | Semba et al. | |
| 2017/0220841 A1 | 8/2017 | Maeda et al. | |
| 2019/0019048 A1* | 1/2019 | Deng | G06F 3/04817 |

FOREIGN PATENT DOCUMENTS

| | | |
|---|---|---|
| JP | 2016-212636 | 12/2016 |
| JP | 2017-097574 | 6/2017 |
| WO | 2004/026139 | 4/2004 |
| WO | 2007/141858 | 12/2007 |

\* cited by examiner

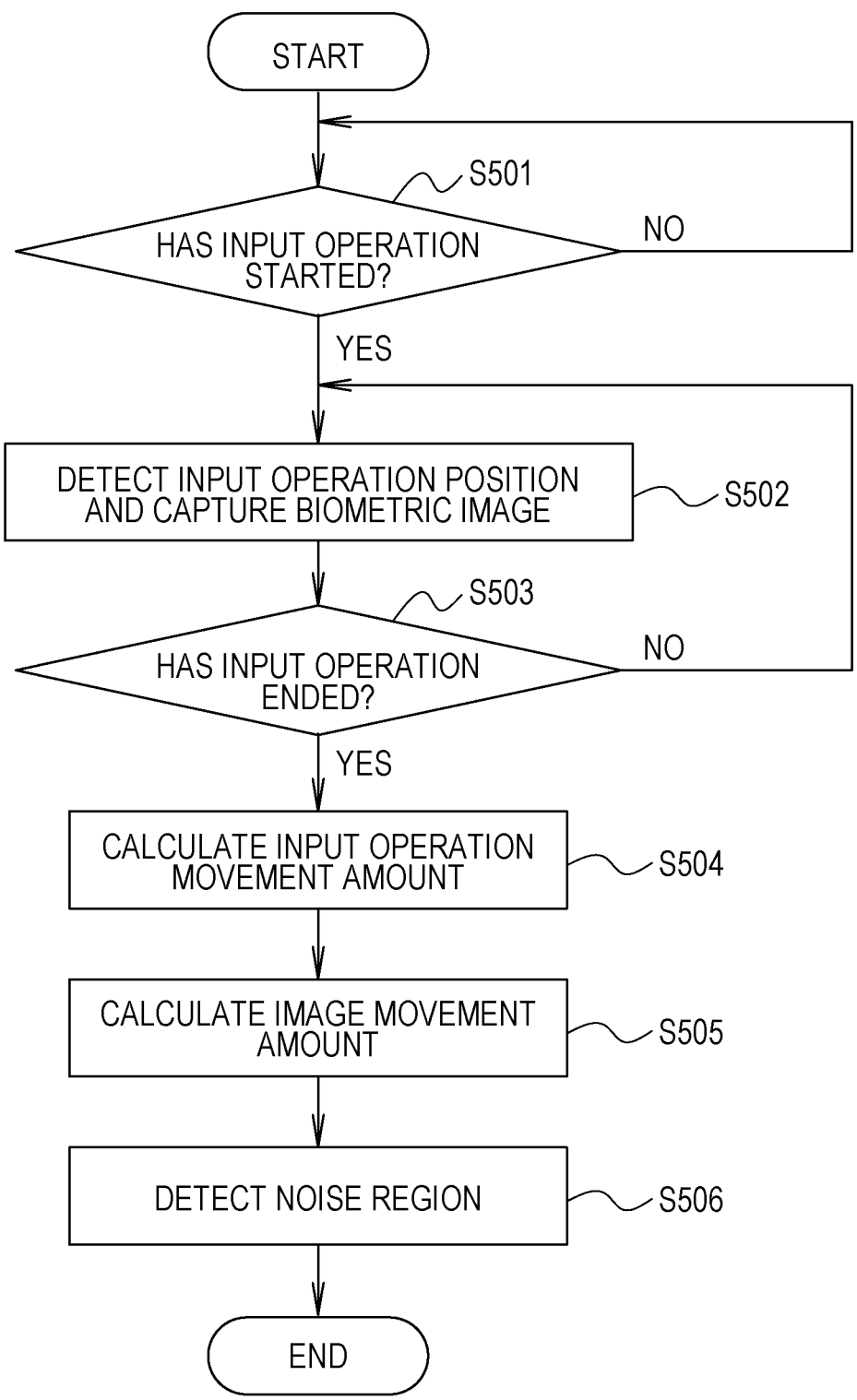

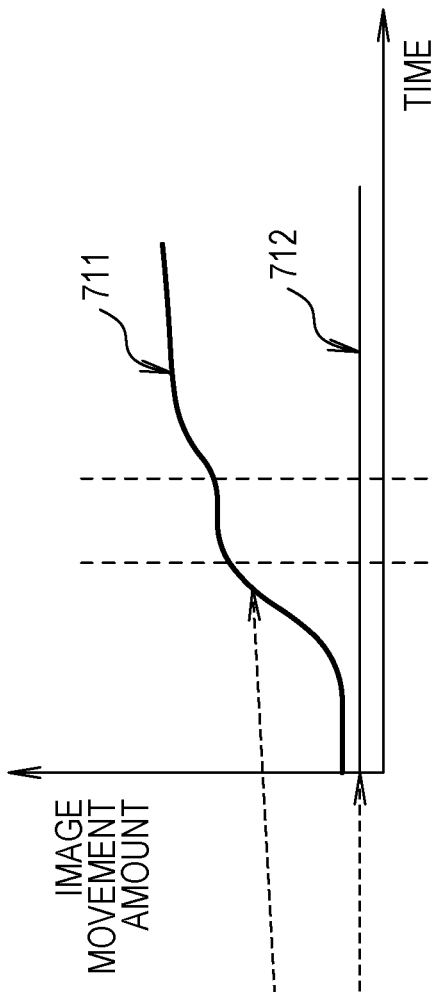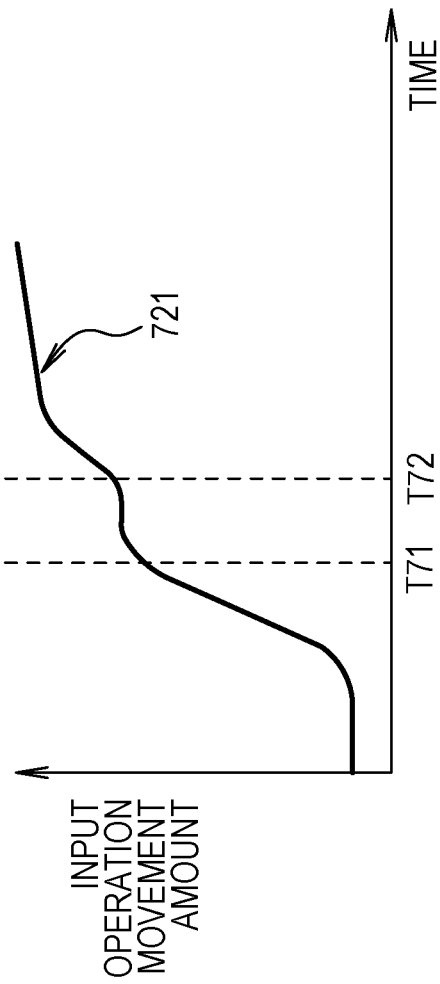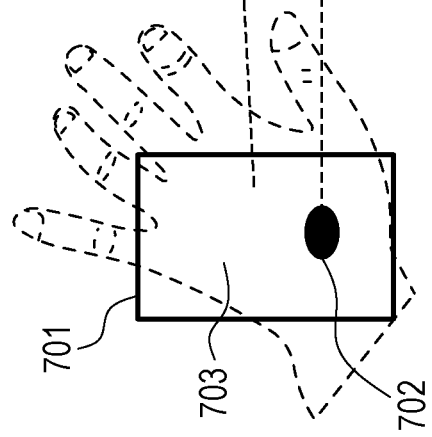

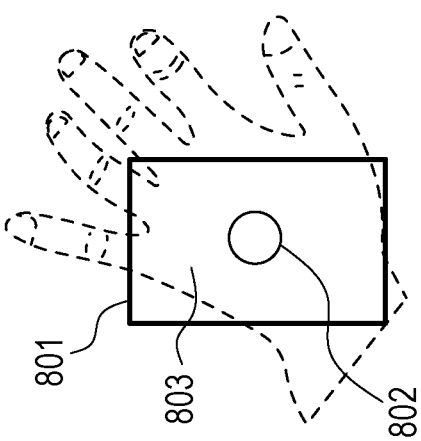
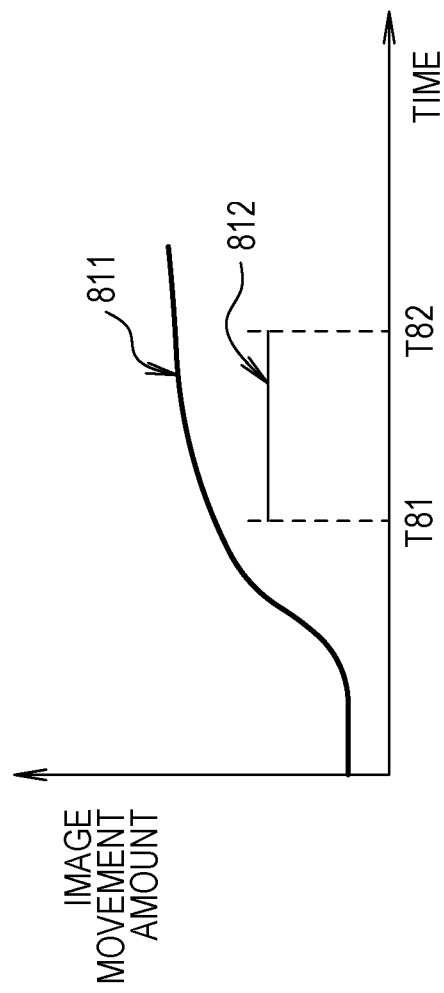
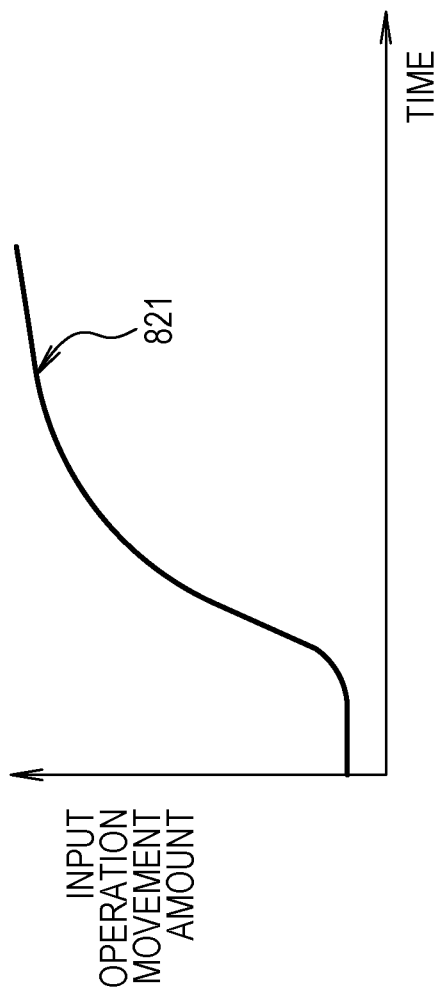

BIOMETRIC IMAGE PROCESSING APPARATUS, BIOMETRIC IMAGE PROCESSING METHOD, AND BIOMETRIC IMAGE PROCESSING PROGRAM

CROSS-REFERENCE TO RELATED APPLICATION

This application is based upon and claims the benefit of priority of the prior Japanese Patent Application No. 2017-231976, filed on Dec. 1, 2017, the entire contents of which are incorporated herein by reference.

FIELD

The embodiments discussed herein are related to a biometric image processing apparatus, a biometric image processing method, and a biometric image processing program.

BACKGROUND

Biometric authentication is a technique for verifying a person identity using the feature of biometric information such as a fingerprint, a face, or veins. In the biometric authentication, the feature of biometric information registered in advance is compared with the feature of biometric information acquired at the time of verification of a person identity. Based on a result of whether these features of biometric information match, the verification of the person identity is performed.

In mobile terminals, biometric authentication has been performed to ensure security. In such a mobile terminal, a biometric sensor acquires biometric information to be used for biometric authentication. However, it is difficult to dispose a biometric sensor having a large image capturing range in the mobile terminal because of the limited size of the mobile terminal. It is also difficult for the biometric sensor to capture the wide-angle image of a living body that is a subject at a position far from the living body from the viewpoint of usability of the mobile terminal. A method is considered of capturing a plurality of images of the living body while causing the liming body to move on the biometric sensor.

However, in the case of, for example, palm vein authentication in which the vein information (vein pattern) of a palm is acquired for the verification of a person identity, a hand that is a subject is held over a mobile terminal and is subjected to image capturing in a manner keeping the hand from coming into contact with a biometric sensor. Accordingly, the position of the hand with respect to the biometric sensor is easily changed because of, for example, the movement of the hand. This causes degradation in the quality of acquired biometric information. As a result, the person identity is easily rejected at the time of authentication.

Many mobile terminals are held by hands and are operated through touch panels provided therein. A technique is disclosed for acquiring information about a palm concurrently with the operation of a touch panel by a hand to keep the positional relationship between a terminal and the hand (see, for example, Japanese Laid-open Patent Publication Nos. 2016-173669, 2016-212636, and 2017-97574). With this technique, the influence of, for example, the movement of the hand may be reduced. For example, a technique is disclosed for displaying touch points on a touch panel one by one for a user and causing a biometric sensor to capture the image of a palm (see, for example, Japanese Laid-open Patent Publication No. 2016-212636). With this technique, biometric information may be efficiently acquired.

A case is imagined where a biometric sensor is touched by a hand when at the time of carrying of a mobile terminal and dirt such as skin oil is attached to the biometric sensor. Such dirt is included in a captured image as image noise and may become a cause of an authentication error. Dirt attached to a biometric sensor is observed at the same position on images. A technique is therefore disclosed for detecting an immobile region on continuous images as dirt (see, for example, International Publication Pamphlet No. WO 2007/141858 and Japanese Laid-open Patent Publication No. 2006-245976). There is a case where extraneous light enters a biometric sensor through the crack of a subject when a mobile terminal is used outdoors and noise caused by intra-lens reflections called lens flare is included in a captured image. A technique is disclosed for detecting such non-stationary noise by detecting a moveless portion on images as noise where motion is observed under ordinary circumstances (see, for example, International Publication Pamphlet No. WO 2004/026139).

In a case where the image of a subject, which moves on the touch panel of a mobile terminal while coming into contact with the touch panel, is captured by a biometric sensor, image noise in the captured image which is caused by, for example, the dirt of the biometric sensor or lens flare may be detected by detecting an immobile region in a plurality of captured images. However, for example, in a case where the movement of the subject stops because of the friction between the subject and the touch panel, the stoppage may be erroneously detected as image noise. It is an object of the present disclosure to improve the accuracy of detecting image noise caused by, for example, lens flare or the dirt of a biometric sensor for capturing the image of a subject which is included in the captured image of a subject that moves on a touch panel while coming into contact with the touch panel.

SUMMARY

According to an aspect of the embodiments, a biometric image processing apparatus includes a touch panel, an biometric sensor configured to capture an image of a living body, and a processor. The processor performs a process including first calculating an amount of movement of a living body that moves on the touch panel while coming into contact with the touch panel, second calculating an amount of movement of each region in images captured by the biometric sensor in a period in which a living body moves on the touch panel while coming into contact with the touch panel, and detecting image noise in the captured images based on the respective amounts of movement calculated by the first calculating and the second calculating.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a flowchart illustrating an exemplary operation of a biometric image processing apparatus according to an embodiment of the present disclosure;

FIGS. 7A to 7C are diagrams describing noise detection according to an embodiment of the present disclosure;

FIGS. 8A to 8C are diagrams describing noise detection according to an embodiment of the present disclosure;

DESCRIPTION OF EMBODIMENTS

Embodiments of the present disclosure will be described below with reference to the accompanying drawings. A biometric image processing apparatus according to an embodiment of the present disclosure and a biometric authentication apparatus to which the biometric image processing apparatus is applied, which are to be described below, may be disposed in a terminal. A terminal may be, for example, a tablet terminal or a mobile terminal (portable terminal) such as a smartphone. Biometric authentication performed using palm biometric information such as palm vein information (vein pattern) or a palm print will be exemplified below, but an embodiment of the present disclosure is not limited thereto.

Figure 1:
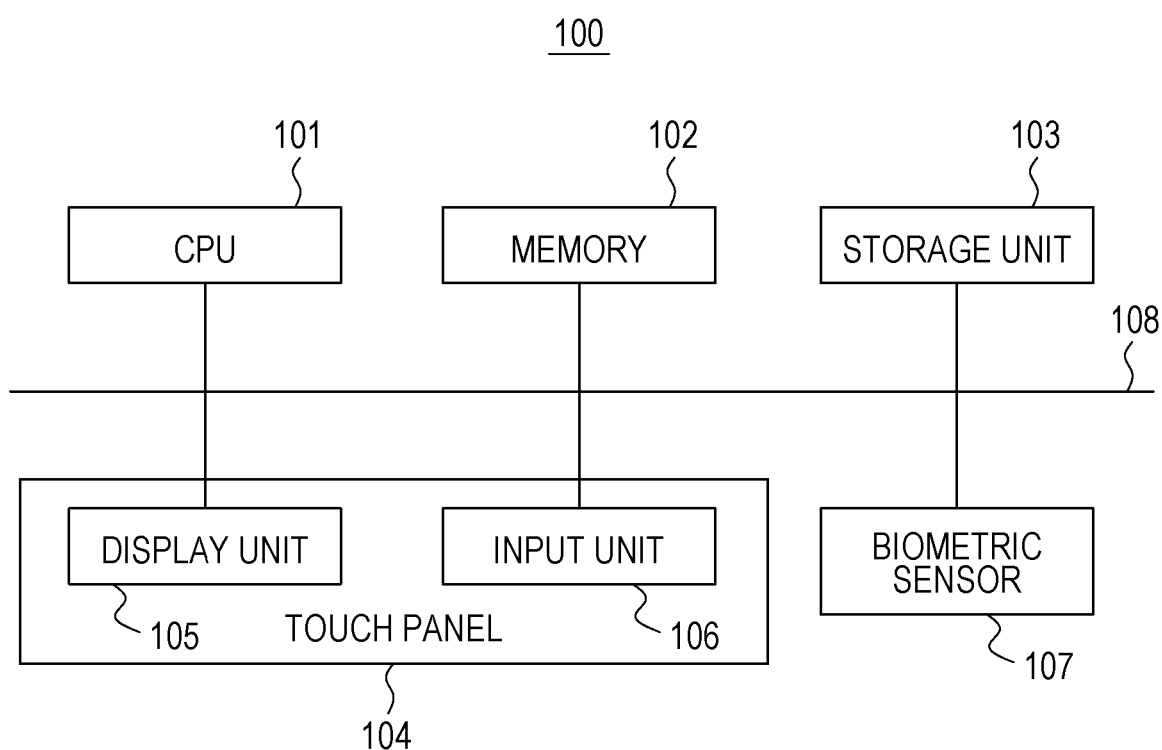
FIG. 1 is a diagram illustrating an exemplary hardware configuration of a terminal according to an embodiment of the present disclosure.

FIG. 1 is a diagram illustrating an exemplary hardware configuration of a terminal according to an embodiment of the present disclosure. A terminal 100 is, for example, a tablet terminal or a mobile terminal (portable terminal) such as a smartphone. The terminal 100 includes a central processing unit (CPU) 101, a memory 102, a storage unit 103, a touch panel 104 (a display unit 105 and an input unit 106), and a biometric sensor 107. These components are connected via a bus 108. The terminal 100 further includes another functional unit such as a communication unit for communicating with another apparatus or a network interface.

Figure 3:
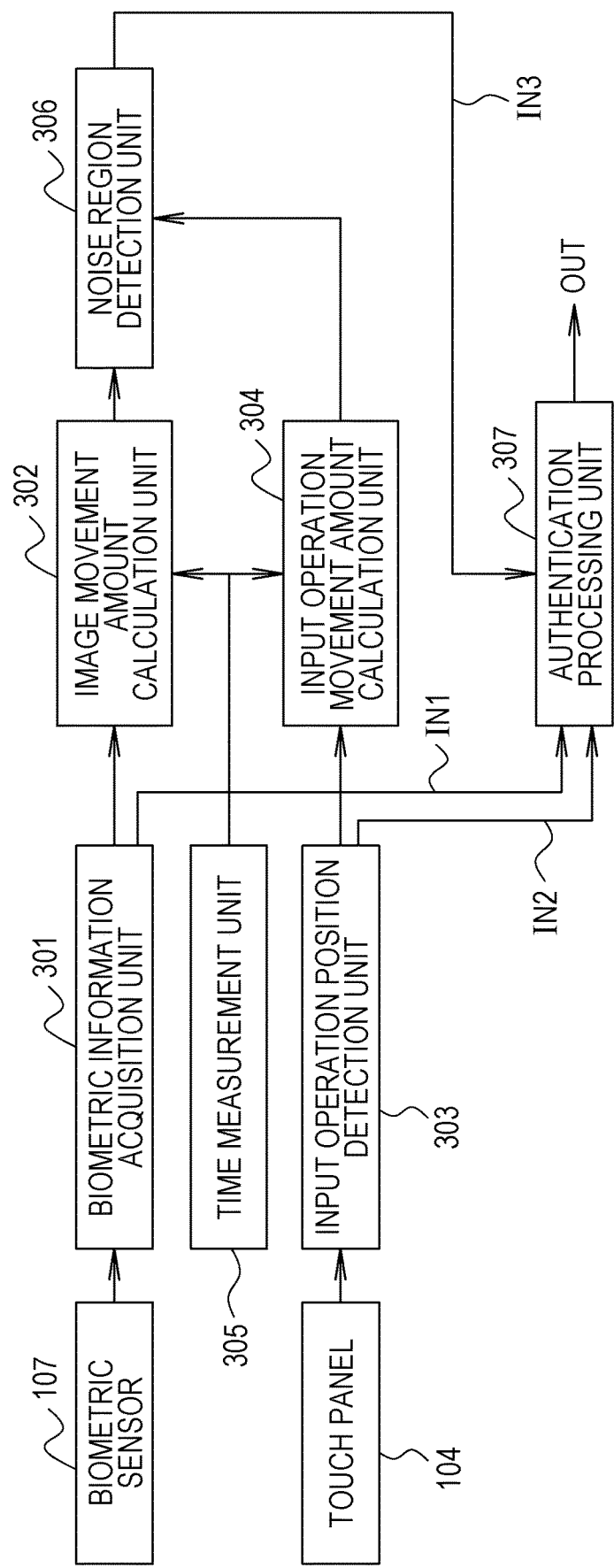
FIG. 3 is a diagram illustrating an exemplary functional configuration of a biometric image processing apparatus according to an embodiment of the present disclosure.

The CPU 101 controls the functional units included in the terminal 100 to perform overall control of the terminal 100. The CPU 101 executes a computer program read from the storage unit 103, thereby realizing various functions of the terminal 100 including biometric image processing and biometric authentication processing. The CPU 101 realizes, for example, the functions of a biometric information acquisition unit 301, an image movement amount calculation unit 302 that is an example of a second calculation unit, an input operation position detection unit 303, an input operation movement amount calculation unit 304 that is an example of a first calculation unit, a time measurement unit 305, a noise region detection unit 306 that is an example of a detection unit, and an authentication processing unit 307 which are illustrated in FIG. 3. The memory 102 is used as a work memory for storing, for example, data that the CPU 101 uses when executing a computer program. The storage unit 103 stores, for example, a computer program executed to perform, for example, biometric image processing or biometric authentication processing and registration data (registration template) to be used in biometric authentication.

The touch panel 104 includes the display unit 105 having a display function and the input unit 106 having an information input function. The display unit 105 displays, for example, information for a user under the control of the CPU 101. The display unit 105 displays, for example, operational information representing touch points to be touched by a user and a movement direction when biometric information to be used for biometric authentication is acquired. The input unit 106 inputs information based on an input operation performed by a user into the CPU 101. The input unit 106 detects a touch operation (including movement after a touch) and inputs coordinates at which the touch operation has been performed into the CPU 101. The CPU 101 performs processing based on screen information displayed by the display unit 105 and information about an input operation input from the input unit 106.

The biometric sensor 107 acquires the biometric information of a subject to be used for biometric authentication. The biometric sensor 107 is an example of an image capturing unit. The biometric sensor 107 includes an image capturing unit (for example, an image sensor) for capturing the image of, for example, a palm that is a subject and a light unit (light source) for illuminating a subject. For example, the biometric sensor 107 is placed at a position that is near the touch panel 10, is on the periphery of the touch panel 10, and is on the same plane as the touch panel 104 so that it may capture the image of at least a part of a palm of a user when the user performs an input operation (touch operation) based on operational information 201 displayed on the touch panel 104 in the terminal 100 as illustrated in FIG. 2A.

Figure 2A:
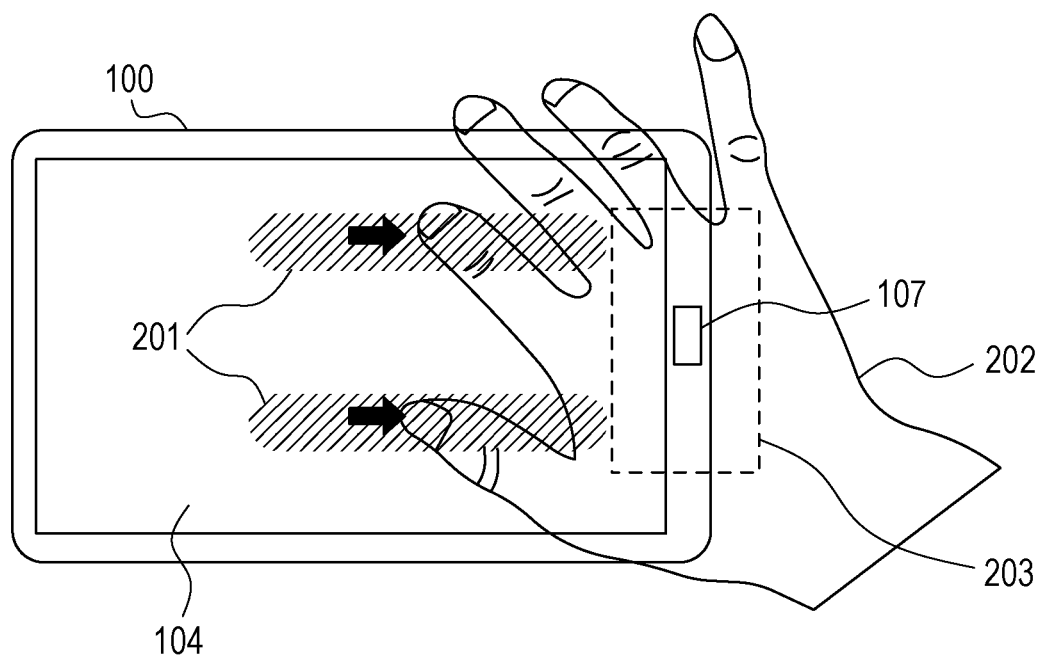
FIGS. 2A and 2B are diagrams describing the acquisition of biometric information according to an embodiment of the present disclosure.
Figure 2B:
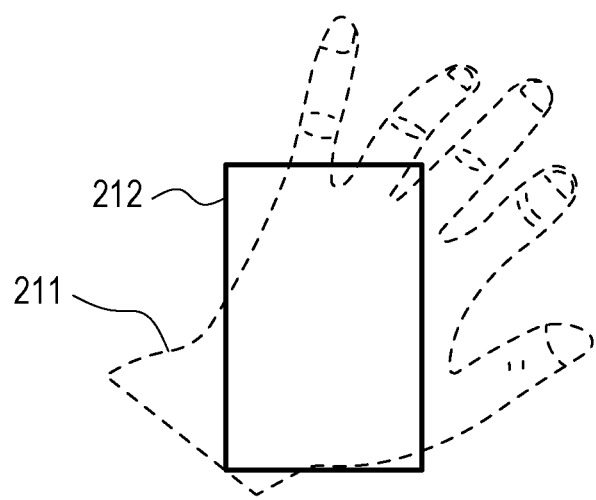

As illustrated in FIG. 2A, when biometric information to be used for biometric authentication is acquired in the terminal 100, the operational information 201 representing touch points to be touched by a user and a movement direction is displayed on the touch panel 104. When a user moves a finger of the user while bringing the finger into contact with the touch panel 104 based on the displayed operational information 201, the image of a part of a subject 202 is captured in an image capturing range 203 based on the angle of view of the biometric sensor 107 and the distance between the biometric sensor 107 and the subject 202 at predetermined time intervals. Thus, a plurality of captured images 212 of a palm that is a subject 211 are acquired as illustrated in FIG. 2B. Biometric information is acquired from these images.

Thus, since a user moves a finger of the user on the touch panel 104 while bringing the finger into contact with the touch panel 104 based on the displayed operational information 201 in this embodiment, the positional relationship between the biometric sensor 107 and a hand that is the subject 202 may be kept. This may suppress the degradation in the quality of acquired biometric information. The operational information 201 illustrated in FIG. 2A is merely illustrative. The displayed operational information 201 may be any information on condition that the positional relationship between the biometric sensor 107 and a hand that is the subject 202 is kept.

FIG. 3 is a block diagram illustrating an exemplary functional configuration of a biometric image processing apparatus according to this embodiment, and illustrates an exemplary case where a biometric image processing apparatus according to an embodiment of the present disclosure is applied to a biometric authentication apparatus for performing biometric authentication using a biometric image. A biometric image processing apparatus according to this embodiment includes the touch panel 104, the biometric sensor 107, the biometric information acquisition unit 301, the image movement amount calculation unit 302, the input operation position detection unit 303, the input operation movement amount calculation unit 304, the time measurement unit 305, the noise region detection unit 306, and the authentication processing unit 307.

The biometric information acquisition unit 301 continuously acquires biometric images (the images of a palm in this embodiment) captured by the biometric sensor 107 that is an example of the image capturing unit when acquiring biometric information to be used for biometric authentication. The image movement amount calculation unit 302 calculates the amount of movement of each region in images based on a plurality of biometric images acquired from the biometric information acquisition unit 301. The image movement amount calculation unit 302 is an example of the second calculation unit.

Various methods called moving body detection techniques may be applied for the calculation of the amount of movement of a region in images. For example, an optical flow method may be applied of estimating the speed (movement) of an object in an image and representing the speed (movement) with a vector. For example, a gradient method or a block matching method may be applied for the estimation of a speed. In the gradient method, the movement of a target is estimated by deriving a relational expression between a time-space differentiation and an optical flow assuming that the brightness of a point on an object does not change after movement. That is, the movement of a target is estimated by searching for a pixel having the same brightness (color) as a certain point on an image near the position of the point on the next image. In the block matching method, the movement of a target is estimated by setting a region having a certain size on an image as a template block, searching the next image for a point having the minimum value of a difference evaluation function, and setting the point as a corresponding point. These methods do not necessarily have to be performed and another method may be employed of acquiring a feature point on an image and calculating the amount of movement of the feature point between images using a corresponding feature point.

The input operation position detection unit 303 detects an input operation (touch operation) performed upon the touch panel 104 and acquires information (coordinates) about a position where the input operation has been performed. The input operation movement amount calculation unit 304 calculates the amount of movement of an input operation representing the amount of movement of a finger of a user based on the information about an input operation position acquired from the input operation position detection unit 303. The input operation movement amount calculation unit 304 is an example of the first calculation unit. The time measurement unit 305 supplies time information to the image movement amount calculation unit 302 and the input operation movement amount calculation unit 304. Since the acquisition of a biometric image and the acquisition of the information about an input operation position are performed at the same time, they are synchronized with each other based on the time information supplied from the time measurement unit 305.

The noise region detection unit 306 detects a region including image noise based on the amount of movement of each region in images calculated by the image movement amount calculation unit 302 and the input operation movement amount calculated by the input operation movement amount calculation unit 304. The noise region detection unit 306 is an example of the detection unit. The movement speed of an image acquired by the biometric sensor 107 changes in accordance with the distance between the biometric sensor 107 and a living body that is a subject. The change in the movement speed of an image (the change in the image movement amount) is proportion to the change in the movement speed of the input operation (the change in the input operation movement amount). The noise region detection unit 306 therefore compares the calculated amount of movement of each region in images and the calculated amount of movement of the input operation with each other and detects a region in an image where the change in the amount of movement thereof does not match the input operation movement amount as a region including image noise. That is, the noise region detection unit 306 detects a region in an image where the change in the amount of movement thereof does not correspond to the input operation movement amount as a region including image noise.

Upon receiving a biometric image IN1 from the biometric information acquisition unit 301, input operation position information IN2 from the input operation position detection unit 303, and a detection result IN3 from the noise region detection unit 306, the authentication processing unit 307 performs biometric authentication processing.

For example, in a case where the detection result IN3 received from the noise region detection unit 306 indicates that the biometric image IN1 is a biometric image including no image noise (the number of regions determined to include image noise is less than a predetermined number), the authentication processing unit 307 performs authentication processing. In a case where the detection result IN3 received from the noise region detection unit 306 indicates that the biometric image IN1 is a biometric image including image noise (the number of regions determined to include image noise is greater than or equal to the predetermined number), the fact that image noise has been detected is displayed for a user and a biometric image is captured again.

For example, in a case where detected image noise is stationary noise, it is estimated that the image noise is dirt attached to the biometric sensor 107. Accordingly, before a biometric image is captured again, a user is encouraged to clean the biometric sensor 107. In a case where stationary noise is detected in the same region in biometric images acquired by performing image capturing a plurality of times after the biometric sensor 107 has been cleaned, it is considered that there is an unrecoverable cause such as a flaw at the biometric sensor 107 or the failure of the biometric sensor 107. In this case, a notification recommending maintenance may be made.

Figure 4:
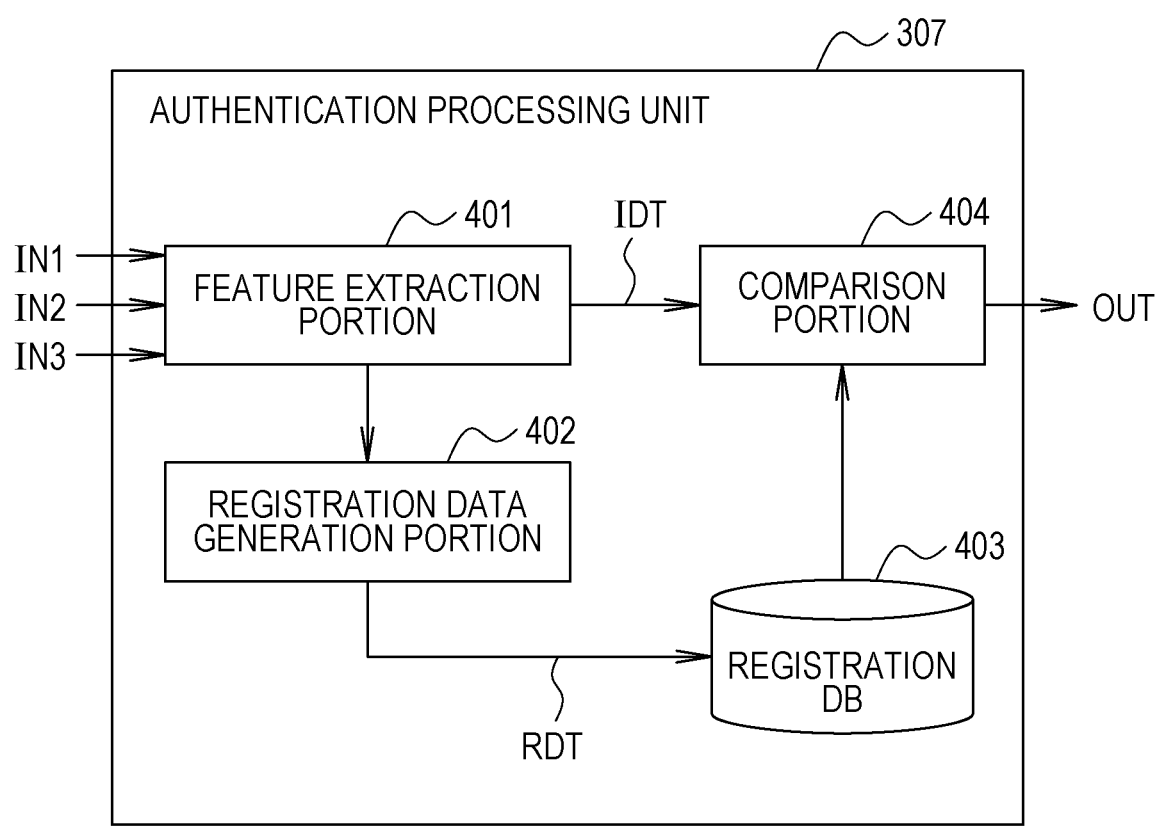
FIG. 4 is a diagram illustrating an exemplary configuration of an authentication processing unit according to an embodiment of the present disclosure.

The authentication processing unit 307 includes a feature extraction portion 401, registration data generation portion 402, a registration database 403, and a comparison portion 404 as illustrated in FIG. 4. The feature extraction portion 401 extracts the feature of biometric information (for example, the vein pattern of a palm or a palm print) from the input biometric image IN1. The feature extraction portion 401 detects, for example, branch points and end points in the vein pattern or in the palm print, and extracts the feature amount of a nearby image including the branch points and the end points as the feature of biometric information. At that time, the feature extraction portion 401 may remove the region detected to include image noise from the biometric image IN1 based on the input operation position information IN2 and the detection result IN3 of the noise region detection unit 306 and extract the feature of biometric information.

The registration data generation portion 402 generates registration data (registration template) including a position and a feature amount from the feature of biometric information extracted by the feature extraction portion 401 at the time of registration of a template. Registration data RDT generated by the registration data generation portion 402 is stored in the registration database 403 for storing a template. The comparison portion 404 compares comparison data (input data) IDT that is the feature of biometric information extracted by the feature extraction portion 401 with registration data (template) stored in the registration database 403 at the time of comparison in biometric authentication. The comparison portion 404 calculates the degree of similarity between the comparison data and the registration data, which indicates how the features of biometric information in the comparison data and the registration data are similar to each other, and outputs a comparison result OUT.

FIG. 5 is a flowchart illustrating an exemplary operation of a biometric image processing apparatus according to this embodiment. FIG. 5 illustrates an image noise detection operation according to this embodiment.

In a period from the detection of the start of a user's input operation performed upon the touch panel 104 (YES in S501) to the detection of the end of the user's input operation performed upon the touch panel 104 (YES in S503), the detection of an input operation position and the capturing of a biometric image are repeatedly performed in step S502. That is, in the period from the detection of the start of an input operation to the detection of the end of the input operation, the touch panel 104 and the input operation position detection unit 303 continuously acquire information about a position (coordinates) where the input operation has been performed and the biometric sensor 107 and the biometric information acquisition unit 301 continuously acquire biometric images.

Subsequently, in step S504, the input operation movement amount calculation unit 304 calculates the amount of movement of a user's finger on the touch panel 104 (the input operation movement amount) based on the acquired input operation position information. In step S505, the image movement amount calculation unit 302 calculates the amount of movement of each region in the captured images (the image movement amount). The order in which the calculation of the input operation movement amount in step S504 and the calculation of the image movement amount in step S505 are performed is not limited to the order illustrated in FIG. 5. After the image movement amount has been calculated, the input operation movement amount may be calculated. Alternatively, the input operation movement amount and the image movement amount may be calculated in parallel.

Subsequently, in step S506, the noise region detection unit 306 compares the input operation movement amount calculated in step S504 and the image movement amount calculated in step S505 with each other to detect a region including image noise in the acquired images. The noise region detection unit 306 detects a region where the change in the image movement amount does not match the change in the input operation movement amount (there is no relative matching between the movement of an image region and the movement of the input operation) as a region including image noise. Thus, the image noise detection operation ends.

According to this embodiment, the amount of movement of a user's finger on the touch panel 104 (the input operation movement amount) and the amount of movement of each region in captured images (the image movement amount) are calculated and a region where the change in the image movement amount does not match the change in the input operation movement amount is detected as a region including image noise. As a result, stationary image noise caused by, for example, the attachment of dirt to the biometric sensor 107 may be detected and non-stationary image noise caused by, for example, lens flare may also be detected. When the change in the image movement amount matches the change in the input operation movement amount, a region including image noise is not detected. Accordingly, in a case where the movement of a subject stops because of the friction between the subject and the touch panel, the stoppage is not detected as image noise. The accuracy may therefore be improved of detecting image noise in an image obtained by causing a biometric sensor to capture the image of a subject (living body) that moves on a touch panel while coming into contact with the touch panel.

Figure 6A:
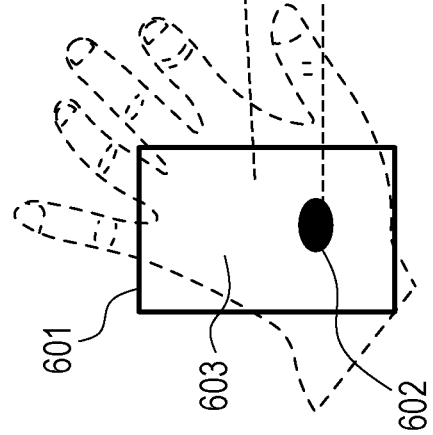
FIGS. 6A to 6C are diagrams describing noise detection according to an embodiment of the present disclosure.
Figure 6B:
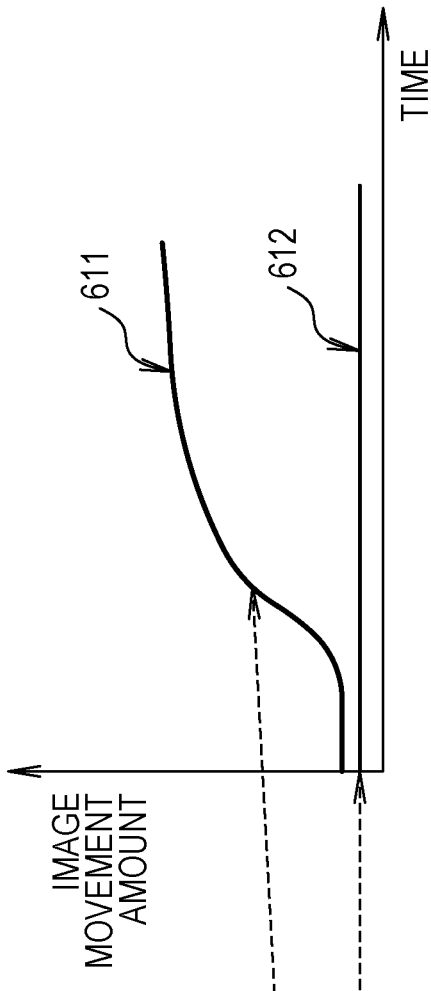

For example, in a case where dirt such as skin oil is attached to the image capturing surface of the biometric sensor 107, a captured image 601 includes dirt 602 in a fixed region as illustrated in FIG. 6A. At that time, from acquired images, an image movement amount 611 of a hand region 603 that is a subject and an image movement amount 612 of a region including the dirt 602 are acquired as illustrated in FIG. 6B.

Figure 6C:
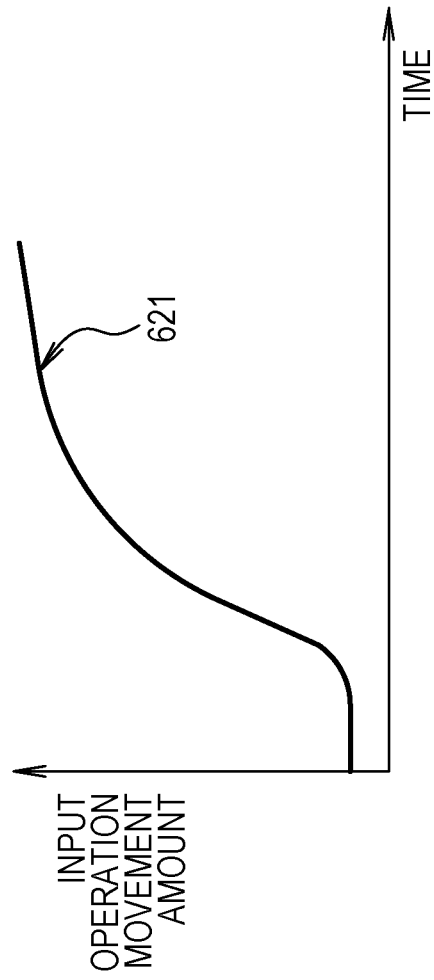

The image movement amount 611 of the hand region 603 changes in proportion to an input operation movement amount 621 of an input operation performed upon the touch panel 104 illustrated in FIG. 6C. On the other hand, the image movement amount 612 of the region including the dirt 602 becomes fixed (zero) irrespective of the input operation movement amount 621 of the input operation performed upon the touch panel 104 illustrated in FIG. 6C. Accordingly, by detecting a region where the change in the image movement amount does not match the change in the input operation movement amount, image noise caused by dirt attached to the image capturing surface of the biometric sensor 107 may be detected.

For example, in a case where dirt such as skin oil is attached to the image capturing surface of the biometric sensor 107, a captured image 701 includes dirt 702 in a fixed region as illustrated in FIG. 7A. It is assumed that the movement of a finger on the touch panel 104 stops in a period from a time T71 to a time T72 because of a friction between the finger and the touch panel. At that time, from acquired images, an image movement amount 711 of a hand region 703 that is a subject and an image movement amount 712 of a region including the dirt 702 are acquired as illustrated in FIG. 7B.

The image movement amount 711 of the hand region 703 becomes fixed in the period from the time T71 to the time T72 in which the movement of the finger stops and changes in proportion to an input operation movement amount 721 of an input operation performed upon the touch panel 104 illustrated in FIG. 7C. Accordingly, although the image movement amount 711 does not change in the period from the time T71 to the time T72, image noise is not detected. Thus, image noise is not detected by mistake. The change in the image movement amount 712 of the region including the dirt 702 is different from the change in the input operation movement amount 721 of the input operation performed upon the touch panel 104 illustrated in FIG. 7C. Accordingly, like in the case illustrated in FIGS. 6A to 6C, by detecting a region where the change in the image movement amount does not match the change in the input operation movement amount, image noise caused by dirt attached to the image capturing surface of the biometric sensor 107 may be detected.

In a case where, for example, lens flare is caused by light streamed in through fingers, a captured image 801 includes reflection noise 802 as illustrated in FIG. 8A. The reflection noise 802 varies in accordance with the position of a hand, and is not observed all the time. In this example, it is assumed that the reflection noise 802 occurs in a period from a time T81 to a time T82. At that time, from acquired images, an image movement amount 811 of a hand region 803 that is a subject and an image movement amount 812 of a region including the reflection noise 802 are acquired as illustrated in FIG. 8B.

The image movement amount 811 of the hand region 803 changes in proportion to an input operation movement amount 821 of an input operation performed upon the touch panel 104 illustrated in FIG. 8C. On the other hand, in the period from the time T81 to the time T82, the change in the image movement amount 812 of the region including the reflection noise 802 is different from the change in the input operation movement amount 821 of the input operation performed upon the touch panel 104 illustrated in FIG. 8C. Accordingly, in a period from the start of an input operation to the end of the input operation, by detecting a region where the change in the image movement amount does not match the change in the input operation movement amount, nonstationary image noise caused by, for example, lens flare may be detected.

Figure 9A:
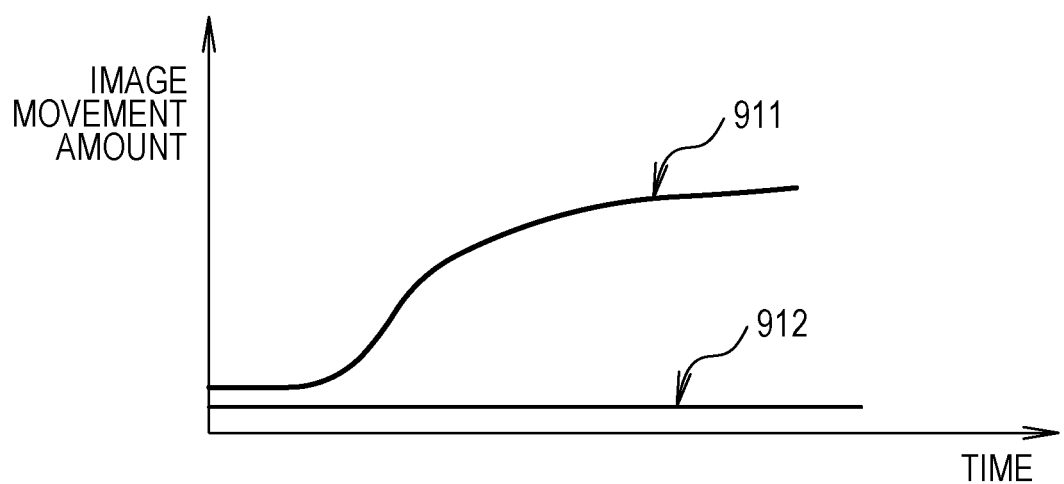
FIGS. 9A and 9B are diagrams describing the detection of a spoofing attack according to an embodiment of the present disclosure.

An image noise detection technique according to this embodiment may also be applied for the detection of a spoofing attack performed with, for example, a liquid crystal display monitor. With an image noise detection technique according to this embodiment, a spoofing attack performed with, for example, a liquid crystal display monitor may be averted. In the spoofing attack performed with, for example, a liquid crystal display monitor, a person who pretends to be a target person holds a liquid crystal display monitor on which a photograph or a moving image, which is biometric information, is displayed over the biometric sensor 107 and causes the biometric sensor 107 to capture the image of a display screen for the purpose of the verification of the identity of the target person in biometric authentication. When the spoofing attack using, for example, a liquid crystal display monitor is performed, light transmitted from a light unit in the biometric sensor 107 is reflected by the liquid crystal display monitor and an image movement amount 911 of a region where reflection does not occur and an image movement amount 912 of a region where reflection has occurred are acquired as illustrated in FIG. 9A.

Figure 9B:
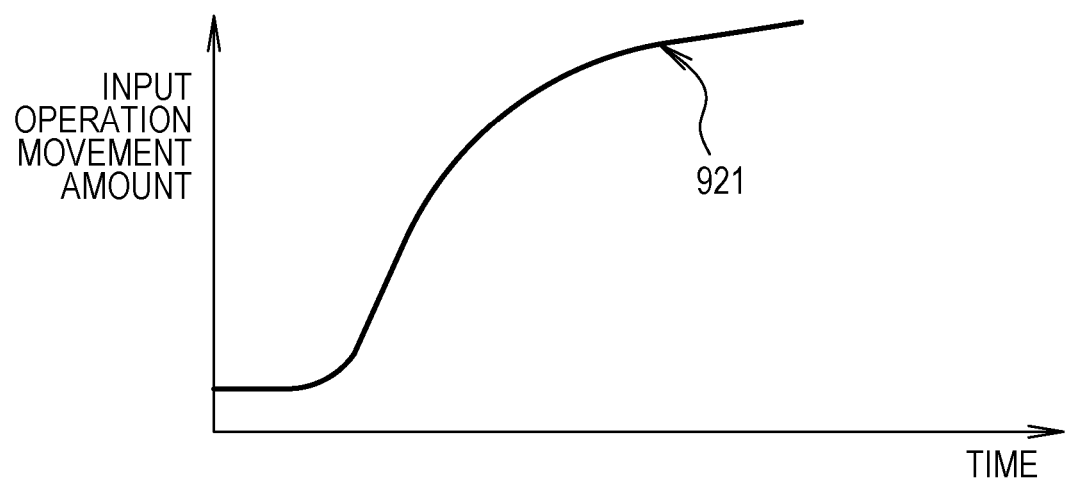

The image movement amount 911 of the region where reflection does not occur changes in proportion to an input operation movement amount 921 of an input operation performed upon the touch panel 104 illustrated in FIG. 9B. However, the change in the image movement amount 912 of the region where reflection has occurred is different from the change in the input operation movement amount 921. Accordingly, by detecting a region where the change in the image movement amount does not match the change in the input operation movement amount, the spoofing attack performed with, for example, a liquid crystal display monitor may be detected.

Figure 10:
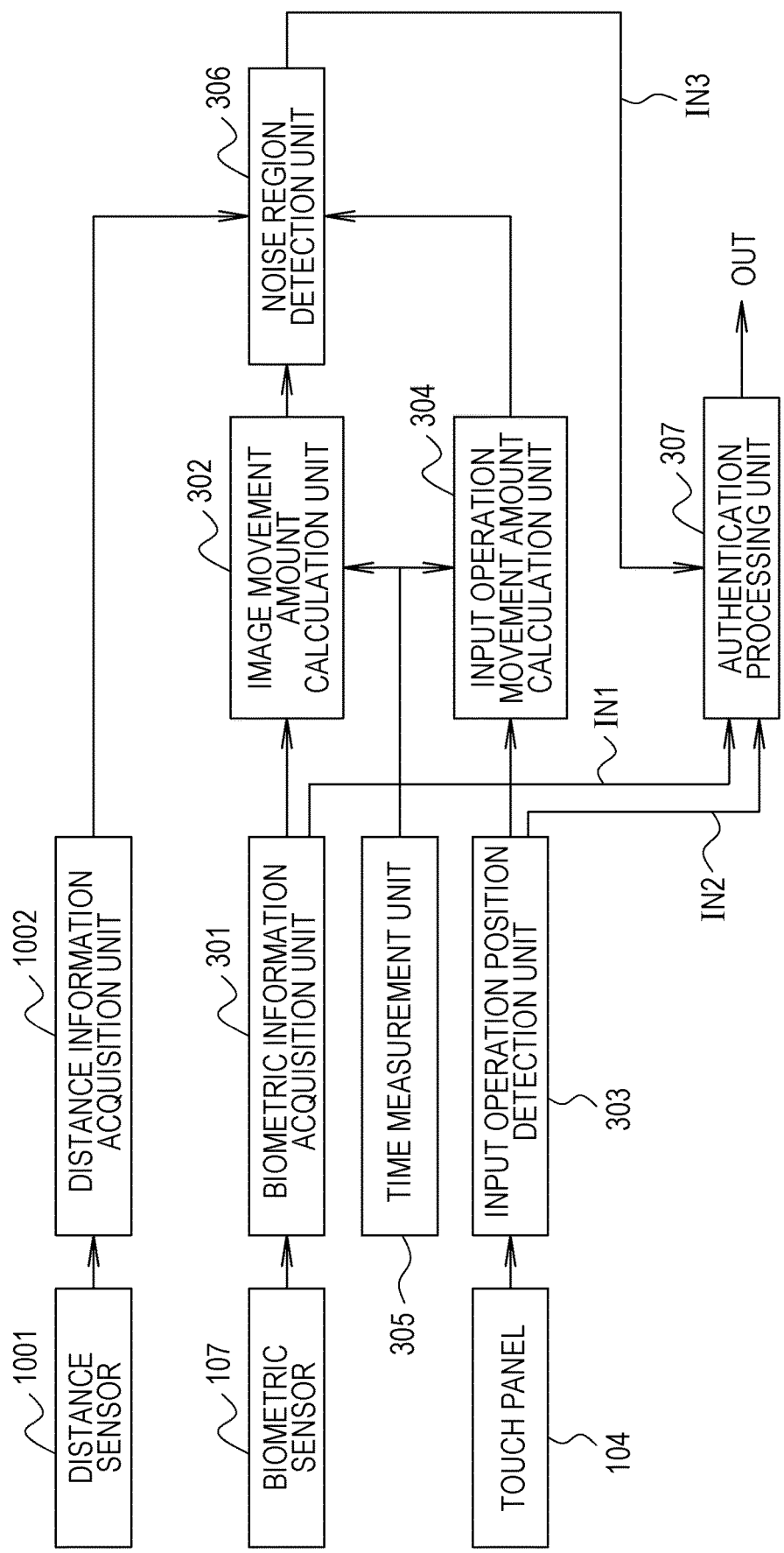
FIG. 10 is a diagram illustrating another exemplary functional configuration of a biometric image processing apparatus according to an embodiment of the present disclosure.

In the above-described exemplary case, based on a result of whether the relative matching between the movement of a finger in an input operation (the change in the input operation movement amount) and the movement of an image (the change in the image movement amount) is established, the detection of image noise is performed. The accuracy of detecting image noise may be further improved using information about the distance between the biometric sensor 107 and a living body (hand) that is a subject. FIG. 10 is a diagram illustrating another exemplary functional configuration of a biometric image processing apparatus according to this embodiment. Referring to FIG. 10, the same reference numerals are used to identify components already described with reference to FIG. 3, and the description thereof will be omitted.

The biometric image processing apparatus illustrated in FIG. 10 includes a distance sensor 1001 and a distance information acquisition unit 1002 in addition to the touch panel 104, the biometric sensor 107, the biometric information acquisition unit 301, the image movement amount calculation unit 302, the input operation position detection unit 303, the input operation movement amount calculation unit 304, the time measurement unit 305, the noise region detection unit 306, and the authentication processing unit 307. The distance sensor 1001 detects the distance between the biometric sensor 107 and a living body (hand) that is a subject. The distance sensor 1001 is an example of a distance detection unit. The distance information acquisition unit 1002 acquires information about the distance between the biometric sensor 107 and a living body (hand) that is a subject from the distance sensor 1001 and outputs the distance information to the noise region detection unit 306.

The noise region detection unit 306 detects a region including image noise based on the amount of movement of each region in images and the input operation movement amount. At that time, based on the distance information acquired from the distance information acquisition unit 1002, the noise region detection unit 306 calculates the relationship between the image movement amount and the input operation movement amount (for example, a proportionality constant in proportionality) based on the distance between the biometric sensor 107 and a living body (hand) that is a subject and detects a region including image noise. Thus, by using information about the distance between the biometric sensor 107 and a living body (hand) that is a subject, the relationship between the change in the image movement amount and the change in the input operation movement amount may be accurately obtained. The accuracy of detecting image noise may be further improved. In this exemplary case, the distance sensor 1001 is provided. However, the distance between the biometric sensor 107 and a living body (hand) that is a subject may be calculated based on, for example, information about the brightness of an image captured by the biometric sensor 107.

A biometric image processing apparatus according to the above-described embodiment and a biometric authentication apparatus to which the biometric image processing apparatus is applied may be realized by, for example, causing a computer to execute a program. A computer-readable recording medium recording the program may also be applied as an embodiment of the present disclosure. Examples of the recording medium include a flexible disk, a hard disk, an optical disc, a magneto-optical disk, a compact disc-read-only memory (CD-ROM), a magnetic tape, a nonvolatile memory card, and a read-only memory (ROM).

A program product with which a program is executed by a computer for the realization of the function of the above-described embodiment may be applied as an embodiment of the present disclosure. Examples of the program product include a program itself realizing the function of the above-described embodiment and a computer into which the program is read. Examples of the program product further include a transmission apparatus that may supply the program to a computer communicably connected thereto via a network, and a network system including the transmission apparatus.

In a case where a supplied program cooperates with an operation system (OS), another application, or the like operating in a computer to realize the function of the above-described embodiment, the program may be applied as an embodiment of the present disclosure. Also in a case where whole or part of processing of a supplied program is performed by a function extension unit in a computer, the program may be applied as an example of the present disclosure. In order to use this embodiment in a network environment, whole or part of the program may be executed by another computer.

The above-described embodiments are merely illustrative embodiments in carrying out the present disclosure, and are not to be construed as limitations to the technical scope of the present disclosure. That is, the present disclosure may be embodied in a variety of forms without departing from its technical idea or its main features.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A biometric image processing apparatus comprising:
   a touch panel;
   a biometric sensor, provided separately from the touch panel, configured to capture an image of a living body; and
   a processor configured to perform a process including:
      first calculating an amount of movement of the living body that moves on the touch panel while coming into contact with the touch panel based on information about positions on the touch panel where input operations are performed;
      second calculating an amount of movement of each region in images captured by the biometric sensor in a period in which the living body moves on the touch panel while coming into contact with the touch panel; and
      detecting a noise region in the captured images based on changes in time of the respective amounts of movement calculated by the first calculating and the second calculating.

2. The biometric image processing apparatus according to claim 1, wherein in the detecting, a region, where a change in the amount of movement calculated by the second calculating does not match a change in the amount of movement calculated by the first calculating, is detected as a region including the image noise.

3. The biometric image processing apparatus according to claim 1, wherein the biometric sensor is disposed on the periphery of the touch panel and is configured to capture an image of at least a part of the living body that moves on the touch panel while coming into contact with the touch panel.

4. The biometric image processing apparatus according to claim 1, wherein in the second calculating, an amount of movement of each region is calculated from a plurality of images captured by the biometric sensor.

5. The biometric image processing apparatus according to claim 1, the process further including:
   measuring a distance between the biometric sensor and the living body whose image is captured by the biometric sensor, and
   wherein in the detecting, the image noise in the captured images is detected based on the respective amounts of movement calculated by the first calculating and the second calculating and the distance detected by the measuring.

6. The biometric image processing apparatus according to claim 1, the process further including,
   displaying, while the image is captured by the biometric sensor, information of a position and a direction to which the living body is to be moved on the touch panel.

7. The biometric image processing apparatus according to claim 1, further comprising an authentication processor configure to extract a feature of biometric information from the image of the living body captured by the biometric sensor to perform authentication.

8. A biometric image processing method comprising:
   first calculating an amount of movement of a living body that moves on a touch panel while coming into contact with the touch panel;
   second calculating an amount of movement of each region in images captured by a biometric sensor, provided separately from the touch panel, in a period in which the living body moves on the touch panel while coming into contact with the touch panel based on information about positions on the touch panel where input operations are performed; and
   detecting a noise region in the captured images based on changes in time of the respective amounts of movement calculated by the first calculating and the second calculating.

9. A non-transitory computer-readable storage medium storing a biometric image processing program configured to cause a computer to perform a process comprising:
   first calculating an amount of movement of a living body that moves on a touch panel while coming into contact with the touch panel;
   second calculating an amount of movement of each region in images captured by a biometric sensor, provided separately from the touch panel, in a period in which the living body moves on the touch panel while coming into contact with the touch panel based on information about positions on the touch panel where input operations are performed; and
   detecting a noise region in the captured images based on changes in time of the respective amounts of movement calculated by the first calculating and the second calculating.

* * * * *